(12) United States Patent
Lisuk et al.

(10) Patent No.: US 12,045,678 B2
(45) Date of Patent: *Jul. 23, 2024

(54) PROVIDING APPLICATION PROGRAMMING INTERFACE ENDPOINTS FOR MACHINE LEARNING MODELS

(71) Applicant: Palantir Technologies Inc., Denver, CO (US)

(72) Inventors: David Lisuk, New York, NY (US); Simon Slowik, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,663

(22) Filed: Apr. 26, 2023

(65) Prior Publication Data

US 2023/0259416 A1 Aug. 17, 2023

Related U.S. Application Data

(63) Continuation of application No. 17/680,859, filed on Feb. 25, 2022, now Pat. No. 11,669,377, which is a (Continued)

(51) Int. Cl.
*G06F 9/54* (2006.01)
*G06F 9/455* (2018.01)
(Continued)

(52) U.S. Cl.
CPC .......... *G06F 9/547* (2013.01); *G06F 9/45558* (2013.01); *G06N 20/00* (2019.01);
(Continued)

(58) Field of Classification Search
CPC .... G06F 9/45533; G06F 9/5077; G06F 9/541; G06F 9/547
See application file for complete search history.

(56) References Cited

U.S. PATENT DOCUMENTS 9,485,234 B1* 11/2016 Roth ....................... H04L 63/08
10,747,600 B2   8/2020 Neijenhuis
(Continued)

FOREIGN PATENT DOCUMENTS

EP            3783482 A1      2/2021

OTHER PUBLICATIONS

Extended European Search Report mailed on Dec. 18, 2020, on application No. 20192015.4-1224.

*Primary Examiner* — Andy Ho
(74) *Attorney, Agent, or Firm* — Faegre Drinker Biddle & Reath LLP

(57) ABSTRACT

One or more virtual machines are launched at an application platform. At each of the one or more virtual machines, a machine learning model execution environment is instantiated for an instance of a machine learning model. A respective instance of the machine learning model is loaded to each machine learning model execution environment. Each loaded instance of the machine learning model is associated with an application programming interface (API) endpoint which can receive input data for the loaded instance of the machine learning model from a client device and return output data produced by the loaded instance of the machine learning model based on the input data.

20 Claims, 6 Drawing Sheets

Related U.S. Application Data continuation of application No. 16/990,233, filed on Aug. 11, 2020, now Pat. No. 11,288,110.

(60) Provisional application No. 62/889,942, filed on Aug. 21, 2019.

(51) Int. Cl.
 *G06N 20/00* (2019.01)
 *H04L 67/133* (2022.01)

(52) U.S. Cl.
 CPC .. *H04L 67/133* (2022.05); *G06F 2009/45562* (2013.01); *G06F 2009/45591* (2013.01); *G06F 2009/45595* (2013.01)

(56) References Cited

U.S. PATENT DOCUMENTS

| | | |
|---|---|---|
| 10,831,519 B2 | 11/2020 | Faulhaber, Jr. et al. |
| 11,170,309 B1 | 11/2021 | Stefani et al. |
| 11,257,002 B2 * | 2/2022 | Faulhaber, Jr. ........ G06N 20/00 |
| 11,269,657 B2 * | 3/2022 | Banerjee ............ G06F 9/44505 |
| 11,288,110 B2 | 3/2022 | Lisuk et al. |
| 2015/0199208 A1 | 7/2015 | Huang et al. |
| 2019/0155633 A1 | 5/2019 | Faulhaber, Jr. et al. |
| 2020/0074241 A1 | 3/2020 | Mahmood et al. |
| 2020/0167437 A1 | 5/2020 | Kasaragod et al. |
| 2020/0311617 A1 | 10/2020 | Swan et al. |
| 2021/0055977 A1 | 2/2021 | Lisuk et al. |

* cited by examiner

300

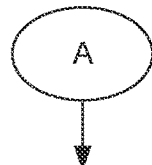

Launch one or more virtual machines at an application platform
310

Instantiate, at each of the one or more virtual machines, a machine learning model execution environment
320

Load a respective instance of the machine learning model to each machine learning model execution environment
330

Associate each loaded instance of the machine learning model with an application programming interface (API) endpoint
340

Fig. 3

PROVIDING APPLICATION PROGRAMMING INTERFACE ENDPOINTS FOR MACHINE LEARNING MODELS

RELATED APPLICATIONS

This application is a continuation of U.S. application Ser. No. 17/680,859, filed Feb. 25, 2022, which is a continuation of U.S. application Ser. No. 16/990,233 (now U.S. Pat. No. 11,288,110), filed Aug. 11, 2020, which claims the benefit of U.S. Provisional Application No. 62/889,942, filed Aug. 21, 2019, the entire contents of which are hereby incorporated by reference herein.

TECHNICAL FIELD

This disclosure relates to the field of data communication and data analysis systems, and in particular to providing application programming interface (API) endpoints for machine learning models.

BACKGROUND

An application programming interface (API) can include a set of functions and procedures that allow third-party devices to access features or data of an operating system (OS), application, or service.

BRIEF DESCRIPTION OF THE DRAWINGS

The present disclosure will be understood more fully from the detailed description given below and from the accompanying drawings of various embodiments thereof, which, however, should not be taken to limit the present disclosure to the specific embodiments, but are for explanation and understanding only.

FIG. 3 is a flow diagram that illustrates a method of provisioning a machine learning model execution environment for use by a client device, in accordance with some embodiments of the disclosure.

DETAILED DESCRIPTION

Figure 1:
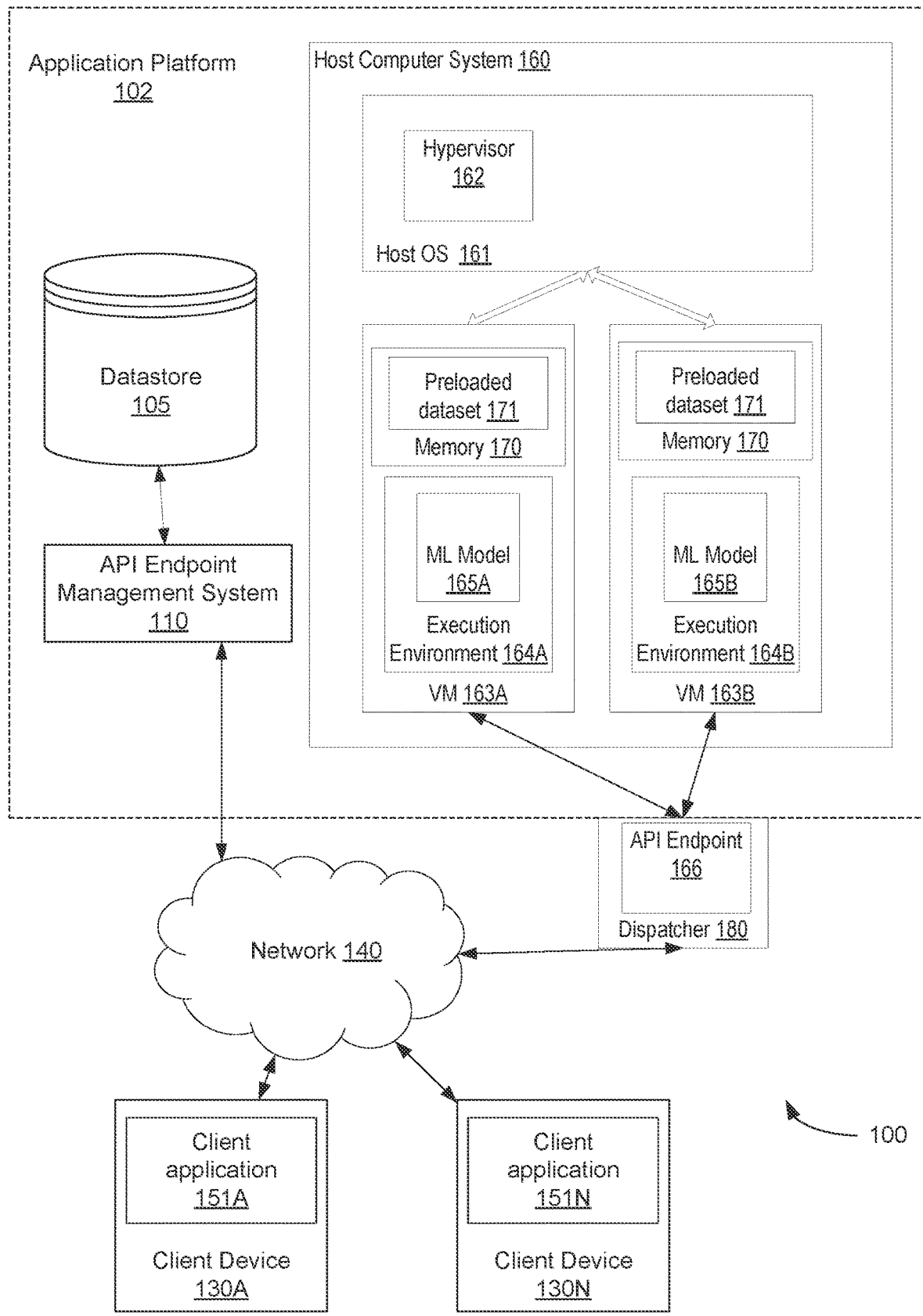
FIG. 1 is a block diagram illustrating a network environment in which an API endpoint management system may operate, in accordance with some embodiments.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In conventional systems, an input dataset that is used as input to a machine learning model is stored in a data file and sent from a client device to a host system. At the host system, a data pipeline with multiple stages can be implemented to feed the input dataset to the machine learning model and obtain output score(s) (e.g., one or more probability scores) produced by the machine learning model. In a stage of the data pipeline, the input dataset can be featurized (e.g., vectorized) such that the input dataset is in the appropriate form for use as input to the machine learning model. In another stage of the data pipeline, the particular model can be identified and loaded in the appropriate execution environment. The output scores of the machine learning model can be sent to the client device so that the client device can make some decision(s) based on the output scores of the machine learning model. In conventional systems, the process of loading the appropriate execution environment, launching it, finding a required machine learning model and adding it to the appropriate execution environment can take several minutes, which is too slow for many applications that make decisions based on output scores of a machine learning model. In addition, if another user needs to use a different machine learning model, a similar process will need to be repeated for the other user after the prior execution is completed.

Aspects of the disclosure address the above technical challenges as well as other challenges by providing a system that maintains an execution environment with a loaded instance of a machine learning model that is ready to be used by a client device. In some embodiments, an application platform runs one or more virtual machines (VMs) or containers. An execution environment that includes an instance of the machine learning (ML) model is instantiated at each of the VMs. An application programming interface (API) endpoint is associated with the VMs and is provided to facilitate access to the ML model execution environments by client devices.

In an illustrative example, a client device can send a request (e.g., an HTTP request) to the API endpoint. The request can include the input dataset for the machine learning model. The input dataset can be applied to an instance of the machine learning model executing at a VM of the application platform. The output of the machine learning model can be sent to the client device (e.g., via an HTTP response). The request/response time using the aforementioned operations can be sub-second, which enables the support of client devices that require machine learning model output scores in the sub-second time-domain.

Additionally, in some embodiments, data associated with the machine learning model can be logged in an audit record. The audit record can include data such as one or more of the request data, the response data, or contextual data (e.g., time, client, ML model identifier, etc.). The audit record can be used, for example, as 1) new training data to further train the machine learning model, 2) for post-analysis of the output scores produced by different instances of the machine learning model, or 3) as preload cached data that can be subsequently used as part of the input data provided to the model during future prediction.

In some embodiments, a graphical user interface (e.g., dashboard) can be implemented to display data of the audit record. Some exemplary graphical user interface elements can include a histogram of predictions of the model, a graph of requests per second, etc. Also, data from the audit record can be used to take additional actions by the host system such as initiating client emails, initiating human intervention (e.g., human intervention in fraud detection), or suggesting appropriate action based on the output score of the machine learning model.

Aspects of the disclosure further address the above technical challenges as well as other challenges by preloading applicable data into memory accessible by the VMs such that the machine learning model execution environment associated with the API endpoint can subsequently use the preloaded data as input to the trained machine learning model. Such an implementation can further lower the request/response time and can address some of the data size constraints associated with requests (e.g., HTTP requests) from the client device.

In an illustrative example, the application platform can preload a table that includes client identifiers that are associated with client account information (e.g., client location, gender, account details, previous purchases, etc.). The request received from the client device can include the client identifier. The application platform can use the client identifier to locate the client account information at the preloaded table. The client account information along with input data from the request can be used as input to the trained machine learning model.

Accordingly, the technology described herein configures and maintains an execution environment with one or more loaded instances of a machine learning model that are ready to be used by a client device. Further, the technology described herein preloads applicable data into memory such that the machine learning model execution environment associated with the API endpoint can subsequently use the preloaded data as input to the trained machine learning model. Providing the above technology reduces request/response time (e.g., latency), and in particular reduces the request/response time in implementations where the request is for a machine learning model output (e.g., one or more probability scores). For example, by using the operations described herein, a request/response time can be sub-second, which enables the support of client devices that require machine learning model output in the sub-second time-domain.

FIG. 1 is a block diagram illustrating a network environment in which an API endpoint management system may operate, in accordance with some embodiments. The network environment 100 can include an application platform 102, and client devices 130A-130N (generally referred to as client device(s) 130), which can be in data communication with application platform 102 via network 140. Computer system 600 illustrated in FIG. 6 may be one example of any of client devices 130, or a server(s) in the application platform 102.

The network 140 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 130 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. Client devices 130 may be part of a network of an organization and each client device 130 may be a user device (e.g., operated by a system administrator, a business analyst or any other member of the organization) or an intermediate device (e.g., a server, a router, etc.) that is part of the organization network and enables communication between one or more client devices 130 and application platform 102. Alternatively, client devices 130 may be independent user devices and each client device 130 may be operated by an end user in an individual capacity.

In some embodiments, client devices 130A-130N can include a respective one of client applications 151A-151N (generally referred to as client application(s) 151) that can implement user interfaces that may be web pages rendered by a web browser and displayed on the client device 130 in a web browser window. In another implementation, the user interfaces of client application 151 may be included in a stand-alone application downloaded to the client device 130 and natively running on the client devices 130 (also referred to as a "native application" or "native client application" herein).

In some embodiments, application platform 102 or client device 130 may include, for example, one or more server computers or any other system providing computing capability. Alternatively, application platform 102 or client device 130 may employ a plurality of computing devices that may be arranged, for example, in one or more server banks or computer banks or other arrangements. Such computing devices may be positioned in a single location or may be distributed among many different geographical locations. For example, application platform 102 or client device 130 may include a plurality of computing devices that together may comprise a hosted computing resource, a grid computing resource or any other distributed computing arrangement. In some cases, application platform 102 or client device 130 may correspond to an elastic computing resource where the allotted capacity of processing, network, storage, or other computing-related resources may vary over time.

In some embodiments, datastore 105 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In some embodiments, application platform 102 can include API endpoint management system 110, datastore 105 storing the underlying data (e.g., enterprise data), and one or more host computer systems 160.

In some embodiments, datastore 105 may include structured or unstructured sets of data that can be divided or extracted for provisioning when needed by one or more components of the API endpoint management system 110. Datastore 105 may include one or more machine learning models, one or more audit records associated with an API endpoint 166, or datasets. A dataset may be defined as a named collection of data.

In some embodiment, the datasets in datastore 105 are both "immutable" and "versioned" datasets. The datasets are "immutable" in the sense that it is not possible to overwrite existing dataset data in order to modify the dataset. The datasets are "versioned" in the sense that modifications to a dataset, including historical modifications, are separately identifiable.

In some embodiments, application platform 102 can perform network virtualization. Network virtualization may refer to providing software-emulated representations of physical network components of physical network infrastructure in the form of corresponding virtual network components hosted by a host computer system 160. The virtual network components may include, for example, one or more application containers and/or one or more virtual machines. The host computer system 160 may execute a host operating system (OS) 161 that manages the one or more application containers. Host OS 161 may also include hypervisor 162 that manages one or more virtual machines. Alternatively, hypervisor 162 may be a separate component running on top of host OS 161, or directly on host hardware without the use of host OS 161.

A virtual machine may be a software-emulated representation of a physical machine, such as a computer system. A virtual machine may include a guest operating system and one or more guest applications running on top of the guest operating system.

An application container (also referred to as "container" herein) can refer to an isolated process in the user-space of the host operating system, sharing the kernel with other containers and/or virtual machines. For example, virtual network components associated with a container may be isolated from other virtual network components associated with another container and/or virtual machine running on the host. A software application running within the container may comprise one or more related components (such as binaries and/or libraries that are necessary to run the application) and may provide a certain service (e.g., an HTTP server, a database server, etc.). The host may be represented by a host computer system 160 or by a virtual machine being executed by the host computer system 160. An application container may be run directly on the host OS and may be run without a hypervisor. As used herein, virtual machine (VM) 163A or 163B (cumulatively referred to as virtual machines 163) can represent either a container running directly on the host OS or a virtual machine running on the hypervisor 162.

The host computer system 160 may be a rackmount server, a workstation, a desktop computer, a notebook computer, a tablet computer, a mobile phone, a palm-sized computing device, a personal digital assistant (PDA), etc. The host computer system 160 includes host hardware, which may include multiple processing devices, memory, physical network interface controllers (NICs), network components, and other hardware components. The memory may include volatile memory devices (e.g., random access memory (RAM)), non-volatile memory devices (e.g., flash memory), and/or other types of memory devices. The host hardware may also be coupled to datastore 105 via a direct connection or a local network. The host computer system 160 may be a single machine or multiple host computer systems arranged in a cluster. Although one host computer system 160 is illustrated, application platform 102 can include one or more host computer systems each hosting one or more virtual machines.

In some embodiments, the hypervisor 162 may manage system resources, including access to memory, NICs, secondary storage, and so on. Alternatively in some embodiments, hypervisor 162 may rely on the host OS 161 to manage the system resources. The hypervisor 162, though typically implemented in software, may emulate and export a bare machine interface (host hardware) to higher level software. Such higher level software may comprise a standard or real-time operating system (OS), may be a highly stripped down operating environment with limited operating system functionality, may not include traditional OS facilities, etc. The hypervisor 162 presents to other software (i.e., "guest" software) the abstraction of one or more virtual machines (VMs) 163, which may provide the same or different abstractions to various guest software (e.g., guest operating system, guest applications, etc.).

In some embodiments, the host computer system 160 hosts any number of virtual machines (VM) 163 (e.g., a single VM, one hundred VMs, etc.). In some embodiments, one or more of VMs 163A-163B can include respective execution environments, such as execution environments 164A and 164B (also referred to as "machine learning model execution environment," herein), respectively.

In some embodiments, execution environment 164A-164B (generally referred to as "execution environment 164," herein) generally refers to one or more components that are used to execute application code. In some embodiments, execution environment 164 can include a run-time component that processes higher level input text (e.g., script) and produces intermediate level or lower level output code, such as binary code. The execution environment can include a run-time complier or interpreter. The run-time component can also be associated with one or more libraries of executable code used to apply input data to a machine learning model and obtain one or more output values produced by the machine learning model.

In some embodiments, machine learning model 165A and machine learning model 165B (generally referred to as "machine learning model 165" herein) are instances of the same machine learning model and can be used by respective execution environments 164A and 164B. In some embodiments, the machine learning model 165 can be stored as a dataset with an accompanying script at datastore 105. In some embodiments, the execution environment 164 can have one or more stages. In one example, the stages can include a pre-processing stage that prepares (e.g., vectorizes) the input data prior to using the processed input data as input to the machine learning model. In another example, the input data is not pre-processed and used as input in the form the data was received from client device 130.

In implementations, the machine learning model 165 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. The machine learning model 165 refers to a trained machine learning model, unless otherwise described.

In some implementations, a training engine is used to train the machine learning model 165 using a training dataset. Once trained, the trained machine learning model 165 can receive new input to produce one or more output values. For example, inputs to the trained machine learning model 165 can include an input data received from client device 130. The output of the trained machine learning model 165 may include confidence data that indicates a level of confidence that the output (e.g., prediction) is appropriate or true, for instance. In one example, the level of confidence is a real number between 0 and 1 inclusive, where 0 indicates no confidence and 1 indicates absolute confidence that the output is appropriate or true.

In some embodiments, memory 170, such as non-volatile memory, is allocated to VM 163. For example, host computer system 160 can allocated or assign memory 170 to each of the VMs 163. In some embodiments, preload data 171 can be loaded to memory 170 so that the VMs 163 can quickly access the preload data 171. Preload data 171 can be used as input to the machine learning model 165. In some embodiments, the preload data 171 (or a subset thereof) can be joined with input data received from client device 130 and used as input to the machine learning model 165. The preload data 171 can be stored as one or more datasets at datastore 105.

In some embodiments, multiple host computer systems 160 can be used by application platform 102. For example, one or more host computer systems 160 can have virtual machines having execution environments for loaded instances of the same machine learning model or different machine learning models.

In some embodiments, API endpoint management system 110 creates and provisions execution environments 164 to include loaded instances of machine learning model(s) 165 (e.g., instances of the same machine learning model or different machine learning models) and provides one or more API endpoints 166 that enable use of execution environments 164 by the client devices 130 at run time.

In some embodiments, an API endpoint can expose services or information of the application platform 120 to one or more of client devices 130. In particular, the API endpoint can allow client device 130 to invoke execution environment 164 executing at a respective VM 163. In some embodiments, an API endpoint 166 can be associated with one or more instances of a machine learning model, such as machine learning model 165. If multiple API endpoints are provided, each of the multiple API endpoints can be associated with instances of the same machine learning model or different machine learning models.

In some embodiments, an API endpoint can be one end of a communication channel, where the other end can be another system, such as client device 130. The API endpoint can include or be accessed using a resource locator, such a universal resource locator (URL), of a server or service. The API endpoint can receive requests from other systems, and in some cases, return a response with information responsive to the request. In some embodiments, HyperText Transfer Protocol (HTTP) methods can be used to communicate to and from API endpoint 166.

In some embodiments, API endpoint management system 110 can perform one or more provisioning operations as described herein. In particular, API endpoint management system 110 can communicate with host computer system 160 to launch one or more VMs 163 at application platform 102. API endpoint management system 110 can instantiate, at each of the one or more VMs 163, a machine learning model execution environment 164 for a particular instance of the machine learning model 165. API endpoint management system 110 can load a respective instance of the machine learning model 165 to each machine learning model execution environment 164. The API endpoint manage system 110 can associate each loaded instance of the machine learning model with an API endpoint 166. In some embodiments, API endpoint management system 110 can generate a notification indicating that the provisioning operations are completed. The notification can include an address of API endpoint 166 (optionally with an identifier of an associated machine learning model instance), which can be provided to client device 130 to enable the client device 130 to direct and receive data from the respective machine learning model execution environment 164 via the API endpoint 166. Specifically, the API endpoint 166 can receive input data for the loaded instance of the machine learning model 165 from the client device 130 and return output data produced by the loaded instance of the machine learning model 165 based on the input data. Operations of the API endpoint management system 110 are further described in the following FIGS. 2-5.

In some embodiments, application platform 102 also includes one or more run-time dispatchers 180 that are each associated with one or more API endpoints 166. Run-time dispatcher 180 can be a component of (or in communication with) API endpoint management system 110 and can communicate with client devices 130 and API endpoints 166. In some embodiments, client device 130 can send a request (e.g., using the address of API endpoint 166 together with or in addition to an access token that confirms an authentication of the client device or a user of the client device as discussed in more detail herein) that includes input data for a desired machine learning model 165. This request may be received or intercepted by run-time dispatcher 180, which can identify active (currently running) VMs 163 that are associated with the API endpoint 166, and determine which of the identified VMs 163 have an available execution environment 164 that has a loaded instance of the desired machine learning model 165 and is not being used in conjunction with input data of any other client device. Run-time dispatcher 180 can then select an execution environment 164 at one of the determined VMs 163 (e.g., based on loads of VMs/hosts, resource capabilities of VMs/hosts, prior sessions of client device 130, etc.), and instruct the API endpoint 166 to forward the input data provided by the client device 130 to the selected execution environment 164. Subsequently, the API endpoint 166 can receive output data produced by the instance of the desired machine learning model 165 based on the input data, and return the output data to the client device 130 directly or via the run-time dispatcher 180.

In some embodiments, the run-time dispatcher 180 can maintain information about machine learning model execution environments 164 currently used for specific client devices 130 and direct a client device 130 to a previously-used execution environment 164 if needed (e.g., if a user of the client device 130 decides to send new input data for the desired machine learning model 165). Upon receiving an indication of completion of a session between the client device 130 and the execution environment 164, the run-time dispatcher 180 can instruct the execution environment to perform a clean-up operation to delete all the data received for and generated during the session to prepare the execution environment 164 for a next session. The indication of completion of the session may be received upon an explicit command of the client device 130 or the execution environment 164 to end the session or upon expiration of a threshold time interval following the most recent data exchange between the client device 130 and the execution environment 164. In some embodiments, the run-time dispatcher 180 may provide information about current sessions to the API endpoint management system 110. This information may include, for example, the input data received from the client device 130, the output data of the instance of the machine learning model 165, data of preloaded dataset 172 used in combination with the input data, how quickly the output data was provided to the client device 130, etc.

Figure 2:
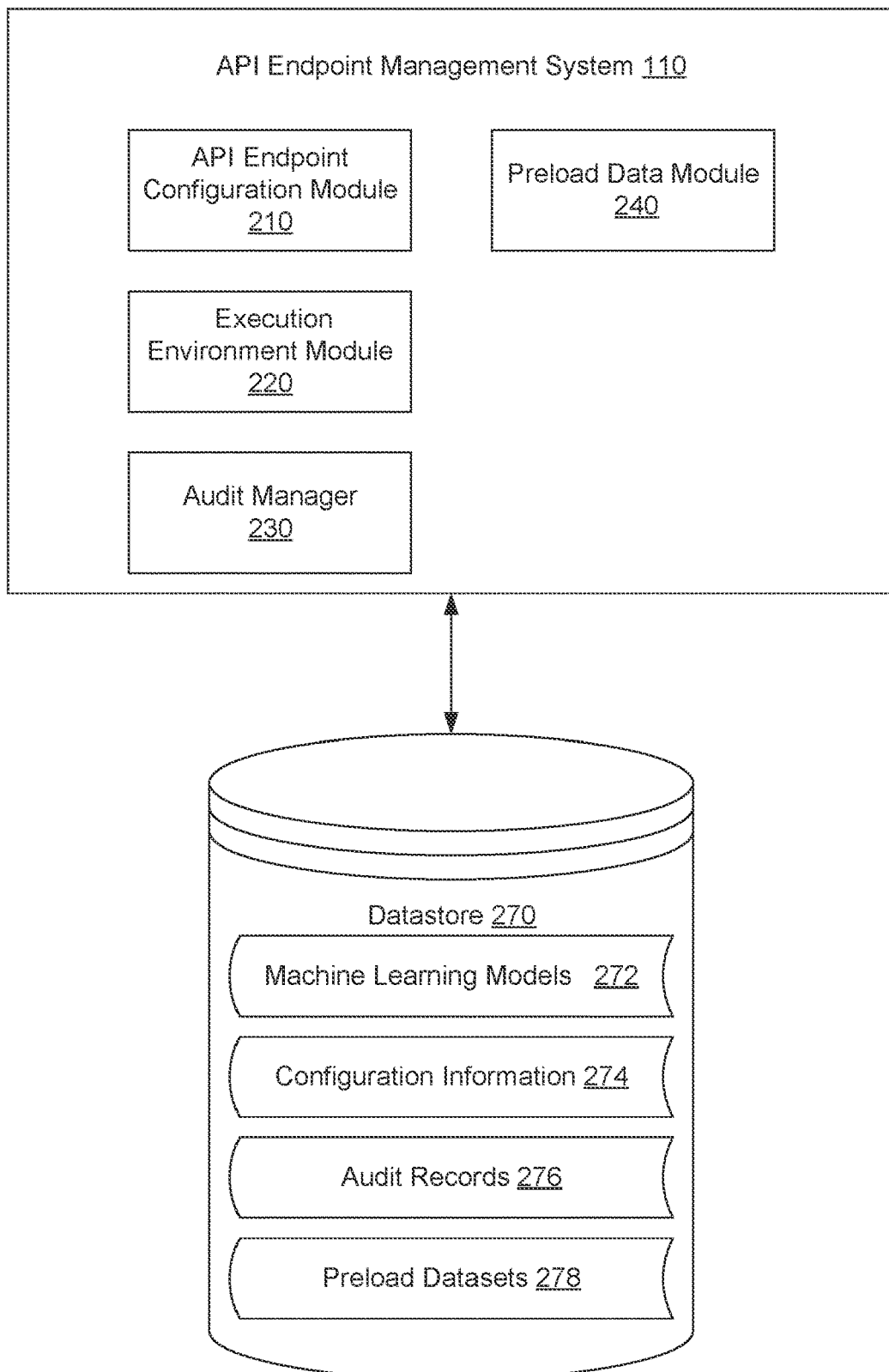
FIG. 2 is a block diagram illustrating an API endpoint management system, in accordance with some embodiments.

FIG. 2 is a block diagram illustrating API endpoint management system 110, in accordance with some embodiments. API endpoint management system 110 may include API endpoint configuration module 210, execution environment module 220, audit manager 230, and preload data module 240.

In some embodiments, datastore 270 is connected to API endpoint management system 110 and includes machine learning models 272, configuration information 274, audit record 276, and preload datasets 278. This arrangement of modules and components may be a logical separation, and in other embodiments, these modules or other components can be combined together or separated in further components, according to a particular embodiment. Elements of FIG. 1 are used to help describe aspects of FIG. 2.

In some embodiments, a single computer system (e.g., application platform 102) may include both API endpoint management system 110 and datastore 270. In another embodiment, datastore 270 may be external to the computer system and may be connected to API endpoint management system 110 over a network or other connection. In other embodiments, API endpoint management system 110 may include different or additional components which are not shown here to simplify the description. Datastore 270 may include a file system, database or other data management layer resident on one or more mass storage devices which can include, for example, flash memory, magnetic or optical disks, or tape drives, read-only memory (ROM), random-access memory (RAM), erasable programmable memory (e.g., EPROM and EEPROM), or any other type of storage mediums. Datastore 270 may be part of datastore 105 or be separate from datastore 105 of FIG. 1.

In some embodiments, API endpoint configuration module 210 of API endpoint management system 110 allows users, such as an administrator of a client device, configure an API endpoint. In some embodiments, a graphical user interface (GUI) (e.g., dashboard) allows a user to provision machine learning services hosted by application platform 102.

In some embodiments, the GUI can allow a user (e.g., a system administrator or a business analyst) of client device 130 to provide training data to a training engine that can train one or more machine learning models, or allow a user to configure an API endpoint to provide to execution environment 164 new input to be applied to the trained machine learning model and to receive the new output of the machine learning model that is then provided to the client device 130. The client device can train a machine learning model at the application platform 102 using training data. The trained machine learning model can be stored at datastore 270 (as represented by machine learning models 272) and associated with a unique identifier (e.g., machine learning model identifier). The execution environment 164 can have different stages used to be able to obtain output data of the machine learning models, as discussed above.

In some embodiments, the client device 130, via the GUI, can specify configuration information 274 (also referred to as "configuration settings" herein) for configuring the API endpoint. In some embodiments, the configuration information 274 can include one or more of a resource locator of the API endpoint, an identifier of the trained machine learning model, or a request to associate the API endpoint with the trained machine learning model. In some embodiments, the configuration information 274 can specify a new API endpoint or an existing API endpoint.

In some embodiments, the configuration information 274 can specify that one or more API endpoints are to be associated with the same or different machine learning model. For example, multiple endpoints can be associated with the same underlying machine learning model. For instance, the multiple endpoints can have different access privileges and be used with different groups of users. In another example, the multiple endpoints can be associated with different versions of the same machine learning model. For instance, the client device 130 can associate a production version of a machine learning model with one API endpoint and associate a staging version of the same machine learning model with another API endpoint. In another example, different API endpoints can be associated with different machine learning models.

In some embodiments, the GUI allows the client device 130 to change the machine learning models that are associated to the same API endpoint. The API endpoint can be agnostic to the underlying machine learning model.

In some embodiments, the configuration information 274 can specify the number of VMs that are to be initially launched. For example, the configuration information 274 can specify one or more of minimum number of VMs, maximum number of VMs, or absolute number of VMs that are to be initially launched in association with a particular API endpoint. In some embodiments, the configuration information 274 can specify the quality of service parameters (e.g., conditions) under which one or more VMs are to be dynamically launched or retired during run-time. For example, the configuration information 274 can specify that if the request and response time between receiving a request (e.g., input data) and responding to the request (e.g., output data) exceeds a threshold time, application platform 102 is to launch one or more VMs (with the execution environment and instances of the specified machine learning model) until the request and response time reaches another threshold time. It can be appreciated that different quality of service parameters can be used in other embodiments.

In some embodiments, the configuration information 274 can further specify authentication requirements to access the API endpoint. For instance, the configuration information 274 can specify if certain users, all users, or the public can access the API endpoint. In some embodiments, different API endpoints that are associated to instances of the same machine learning model can have different access settings.

In some embodiments, the configuration information 274 can also include scheduling information that specifies when the API endpoint should be turned on or off. For example, the configuration information 274 can specify that the API endpoint is to be turned on between 1 PM-11 PM PST every day, and be turned off otherwise.

In some embodiments, the GUI can be used to adjust previously selected configuration information 274. For example, the client device can use the GUI to change which trained machine learning model is associated to the API endpoint. The configuration information 274 can be stored at datastore 270.

In some embodiments, execution environment module 220 of API endpoint management system 110 can provide an execution environment with a loaded instance of a machine learning model that is ready to be used by a client device. In some embodiments, execution environment module 220 can receive a request from client device 130 to prepare for launching of execution environment 165 for a particular instance of machine learning model 165. The request can identify relevant configuration information stored at application platform 102. Based on the respective configuration information 274, execution environment module 220 can launch one or more VMs at the application platform 102. For example, execution environment module 220 can communicate with the host computer system to direct the host computer system to launch one or more VMs pursuant to the configuration information 274.

In some embodiments, execution environment module 220 instantiates (e.g., via the host computer system) a machine learning model execution environment at one or more of the VMs. For example, execution environment module 220 can identify the corresponding execution environment and direct host computer system to instantiate the corresponding execution environment at the one or more VMs. In some embodiments, the machine learning model execution environment can be configured specifically for the particular machine learning model that is used the machine learning model execution environment. For example, the machine learning model stored at datastore 270 can be associated with a particular library or other prerequisites that are to be included in the machine learning model execution environment.

In some embodiments, execution environment module 220 loads an instance of the machine learning model at the machine learning model execution environment at one or more of the VMs (e.g., by identifying the machine learning model or otherwise providing an instance of the machine learning model to the VM), and associates the instance of the machine learning model and/or the machine learning model execution environment with an API endpoint (e.g., using an identifier of the machine learning model instance and an identifier (e.g., the address) of the API endpoint). Execution environment module 220 may store the association information in the datastore 270.

In some embodiments, the execution environment module 220 can send a message to the client device 130 indicating that the API endpoint has been provisioned (or execution environment 164 has been launched) pursuant to the request from the client device 130. The message may include an identifier (e.g., address) of the API endpoint.

In some embodiments, the execution environment module 220 receives from the client device 130 an authentication request that includes authentication credentials (e.g., user name and password) of an account of a user associated with client device 130. In some embodiments, the authentication request can be received prior to the request that includes input data for the machine learning model. In other embodiments, the authentication request can be a request that is provided with the request that includes the input data. In some embodiments, execution environment module 220 can authenticate the user account based on the authentication credentials. In some embodiments, execution environment module 220 generates an access token based on the authenticating of the user account. The access token is sent to the client device 130. The access token or information generated using the access token can be part of subsequent requests to the API endpoint. The run-time dispatcher 180 or API endpoint management system 110 can use the access token or information derived therefrom to determine that the client device 130 has been previously authenticated.

In some embodiments, the client device 130 can send via the API endpoint, a first request that includes input data for the machine learning model. The input data is provided to a respective VM and used as input to the instance of the machine learning model at the respective VM. Output data is obtained from the instance of the machine learning model. A first response to the first request is sent to the client device 130. The first response includes an indication of the output data of the machine learning model. The API endpoint can receive many requests with input data and provide responses that include respective output data.

In an illustrative example, the client device 130 can send an HTTP request to the API endpoint. The HTTP request can include the input data for the machine learning model. The input data can be applied to an instance of the machine learning model at a VM of the host computer system. The output of the machine learning model can be sent to the client device via an HTTP response.

In embodiments, the execution environment module 220 maintains the execution environment with the loaded instances of the machine learning model so that the machine learning model is ready to be used responsive to a request from a client device 130.

In some embodiments, audit manager 230 of API endpoint management system 110 can create an audit record 276 to record audit information that includes information that is associated with an API endpoint. In some embodiments, audit information associated with each request and response received and sent from the API endpoint, respectively, can be recorded in the audit record 276.

In some embodiments, the audit information can include the input data received in the request from client device 130. In some embodiments, the audit information can include output data generated by the machine learning model using the input data. In some embodiments, the audit information can also include contextual information with respect to one or more of the request or response. For instance, the contextual information can include an identification of the entity, device, or user that made the request, the user access token associated with the request, a copy of the request made by the client device 130, a copy of the response sent to the client device 130, an identifier of the machine learning model, an identifier of the instance of the VM using the machine learning model, an identifier of the request, an identifier of the response, date and time information, and so forth. Some of this audit information can be provided to API endpoint management system 110 by run-time dispatcher 180 and/or execution environment 164.

In some embodiments, the audit information can include result information that indicates a result of the output data after being received by the client device 130. For example, the output data of the machine learning model can be used by the client device 130 to take some action, such as recommending a particular item at a web page hosted by the client device 130. Additionally, the user can also take some action with respect to the recommended item, such as ignore the item, select the item for preview, purchase the item, and so forth. In the above example, the results can include recommended item X and the user's selection of item X for preview but not a purchase of item X. In some embodiments, the client device 130 can send the results back to the application platform 102 or the run-time dispatcher 180 using an identifier that associates the results to the corresponding output data that was generated by the machine learning model and sent in a corresponding response. Audit manager 230 can receive the result(s) and record the results at the audit record 276 such that the results are associated with the corresponding output data and/or request and response. In some embodiments, the audit records 276 can be stored as one or more datasets.

In some embodiments, audit manager 230 can use the audit information of the audit record 276 to perform one or more operations. In some embodiments, the one or more operations can include a validation operation that is used to validate the output data obtained from an instance of a machine learning model (e.g., first instance of the machine learning model) executing at a respective VM (e.g., first VM) with the output data from another instance of the machine learning model (e.g., second instance of the machine learning model) executing at another VM (e.g., second VM). In performing the validation operation, the input data to both the first instance and the second instance of the machine learning model is the same. As such, the output data returned by both instances of the machine learning model in most cases is expected to be the same as well. If the output data is not the same, an alert message can be triggered and sent to an administrator of application platform 102 to follow up with a corrective action.

In some embodiments, the one or more operations can include a continued training of the machine learning model. For example, the audit information of the audit record 276 can be used as training data to further train the machine learning model, and the previous machine learning model can be replaced with the recently trained machine learning model.

In some embodiments, the one or more operations can include using the audit information of the audit record 276 to populate data of a preload dataset. A preload dataset is further described below with respect to preload data module 240.

In some embodiments, audit manager 230 can use the audit information of the audit record 276 to generate one or more graphical user interface elements that can be displayed at a GUI that is accessible to the client device 130. In some embodiments, audit manager 230 can display the raw audit information at the GUI. In some embodiments, the audit manager 230 can perform one or more data processing operations on the audit information to generate audit data output. The audit manager 230 can provide a GUI to present a graphical representation of the audit data output (e.g., chart, graph, etc.).

For example, a GUI element of the GUI can display the number of requests per second received at the API endpoint. In another example, the GUI element can display a histogram of the predictions (e.g., output data) of the machine learning model associated with the API endpoint.

In some embodiments, the audit manager 230 can use the audit information of the audit record 276 to take additional actions, such as emailing the client device 130, initiating human intervention, or suggesting a subsequent action. For example, for an insurance client, input data to the machine learning model or output data from the machine learning model can indicate a fraudulent insurance claim that is associated with a particular user. Responsive to determining a potential fraudulent insurance claim, audit manager 230 can send an email to inform the client of a potentially fraudulent insurance claim or initiate human intervention to investigate the potentially fraudulent insurance claim.

In some embodiments, preload data module 240 of API endpoint management system 110 can preload data in memory (e.g., non-volatile memory accessible by the VMs) such that the machine learning model associated with the API endpoint can subsequently use the preloaded data as input to the trained machine learning model. In some embodiments, the preload data can be loaded into memory as part of providing an execution environment with a loaded instance of a machine learning model. In some embodiments, the preload data can be used such that a request to the API endpoint does not have to contain all the data that is used as input to the machine learning model. For example, responsive to a request that includes input data, relevant data from the preloaded data can be identified and aggregated with the input data. The aggregated input data can be used as input for the machine learning model.

In an illustrative example and as noted above, the preload data module 240 can preload a table that includes client identifiers that are associated with client account information (e.g., client location, gender, account details, previous purchases, etc.). The HTTP request received from the client device 130 can include the client identifier. The host system can use the client identifier to locate the client account information at the preloaded table. The client account information along with input data from the HTTP request can be joined and used as input data to the trained machine learning model.

In some embodiments, the machine learning model can be associated with an identifier that indicates which of the preload datasets 278 is to be loaded into memory for use with the machine learning model at run-time. In some embodiments, the preload data can be specified by the client device 130, such as an administrator of the client device 130, and stored in the configuration information 274 associated with the API endpoint. In some embodiments, the preload data can be determined based on some criteria or logic. For instance, the preloaded data can be the account information of the most recent 50 customers. In some embodiments, the preload data can be retrieved from the audit record 276. In some embodiments, the preload data can be retrieved from an external source based on some logic (e.g., logic specifying which data to use, where to get the data, the criteria on which the preloaded data is selected, etc.). Additional details of preload data are described with respect to FIG. 4.

Figure 4:
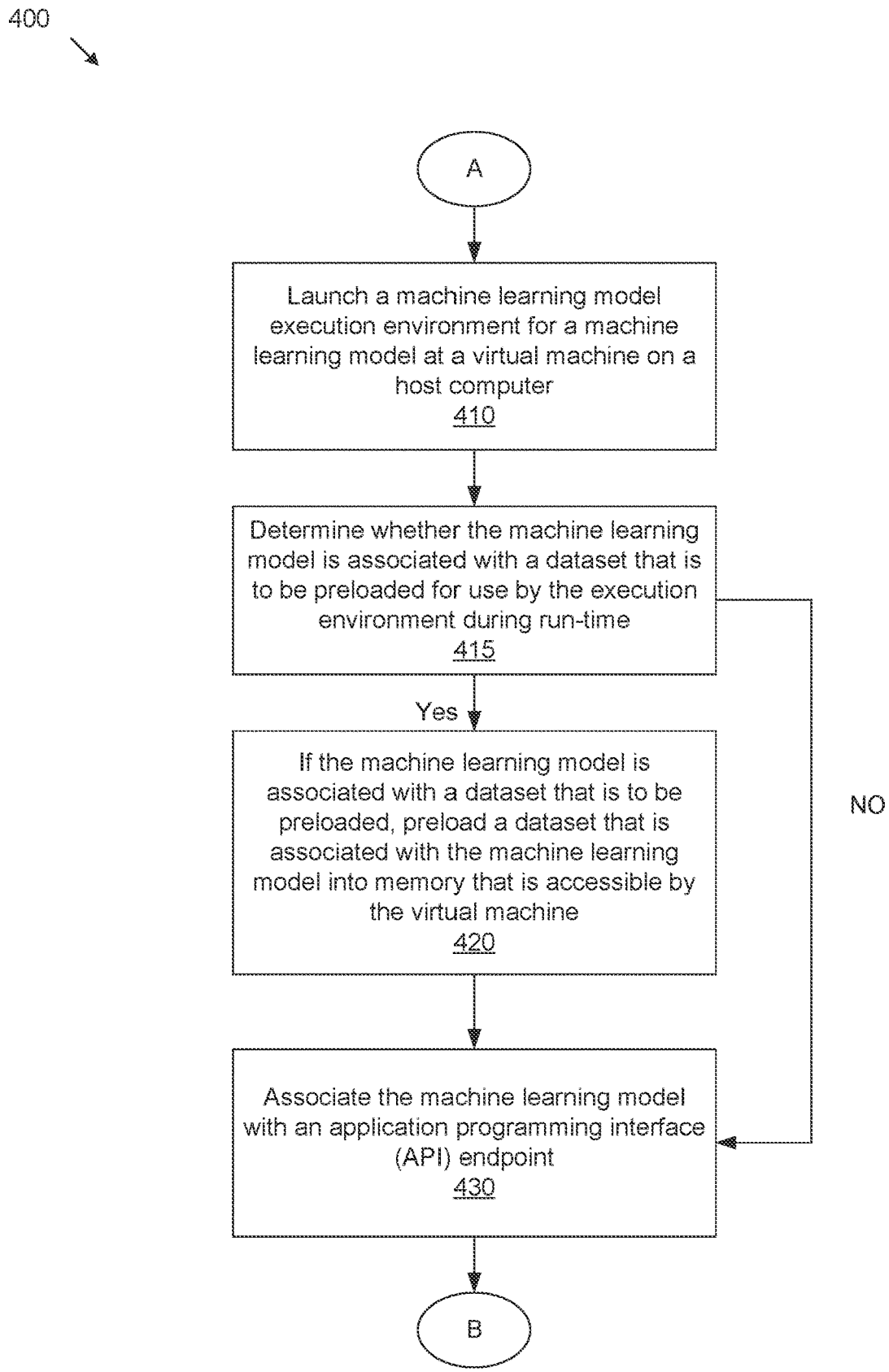
FIG. 4 is a flow diagram illustrating a method of preloading data into memory for use by a machine learning model execution environment at a virtual machine, in accordance with some embodiments of the disclosure.
Figure 5:
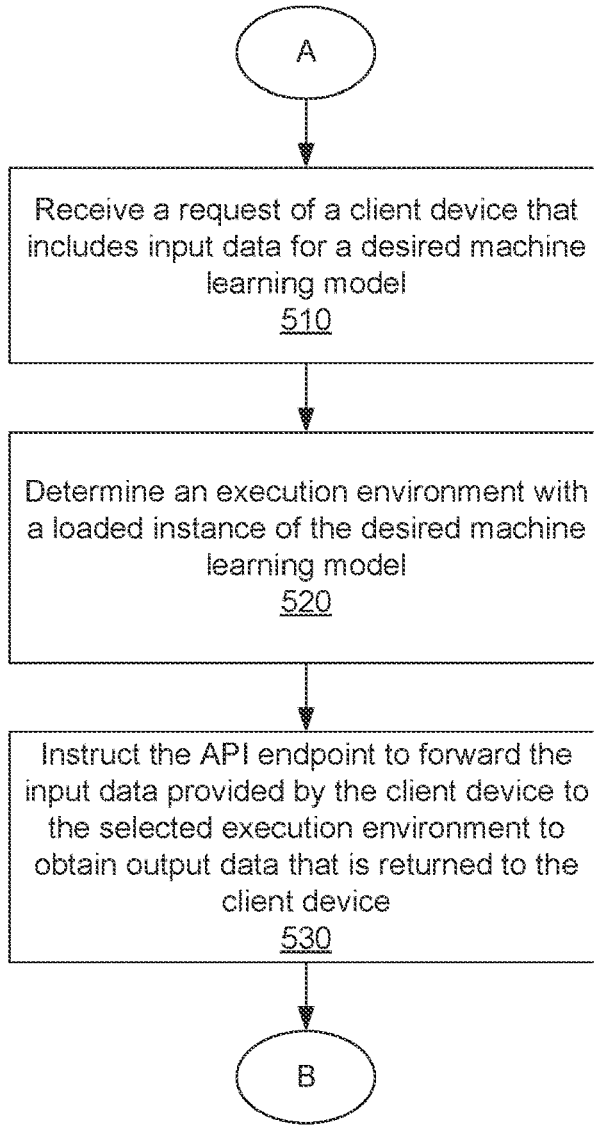
FIG. 5 is a flow diagram illustrating a method of providing output data of a machine learning model to a client device via an API endpoint, in accordance with some embodiments of the disclosure.

The following methods described with respect to FIGS. 3-5 can be performed by processing logic that may include hardware (circuitry, dedicated logic, etc.), software (e.g., instructions run on a processing device), or a combination thereof. In some embodiments, some or all the operations of methods may be performed by one or more components of network environment 100 of FIG. 1. In some embodiments, one or more operations of the methods may be performed by API endpoint management system 110 of application platform 102 as described with respect to FIG. 1. It may be noted that components described with respect FIG. 1 may be used to illustrate aspects of FIGS. 3-5. It can further be noted that the operations of each of the methods can be performed serially, in parallel, or with the same, fewer, greater, or different operations in some embodiments.

FIG. 3 is a flow diagram that illustrates a method of a provisioning a machine learning model execution environment for use by a client device, in accordance with some embodiments of the disclosure.

A block 310, processing logic of API endpoint management system 110 launches one or more virtual machines at an application platform. In some embodiments, processing logic can use the configuration information to determine the number of VMs to launch for the particular API endpoint.

At block 320, processing logic instantiates, at each of the one or more virtual machines, a machine learning model execution environment for an instance of a machine learning model. In some embodiments, processing logic can use the configuration information to identify the components of the machine learning model execution environment.

At block 330, processing logic loads a respective instance of the machine learning model to each machine learning model execution environment. In some embodiments, processing logic can use the configuration information to identify the machine learning model that is to be loaded at the machine learning model execution environment.

At block 340, processing logic associates each loaded instance of the machine learning model with an application programming interface (API) endpoint. In embodiments, the API endpoint is to receive input data for the loaded instance of the machine learning model from a client device and to return output data produced by the loaded instance of the machine learning model based on the input data.

In some embodiments, processing logic receives a request (e.g. configuration request) by the client device to configure the API endpoint (e.g., provide an execution environment with a loaded instance of the machine learning model that is ready to be used by the client device 130). Processing logic can identify configuration information specified by the request and stored at the application platform 102. An identifier of the machine learning model and a resource locator of the API endpoint can be specified by the configuration information. In some embodiments, responsive to the configuration request, processing logic can perform the operations at block 310-340. Once configured, processing logic maintains the machine learning model execution environment that uses a loaded machine learning model associated with the API endpoint such that the API endpoint can be used by the client device without having to re-launch VMs, initiate machine learning model execution environment at the VMs, or load an instance of the machine learning model in the respective machine learning model execution environment at each VM.

Subsequently, processing logic can receive, from the same or different client device, an authentication request that includes authentication credentials corresponding to an account. Processing logic can authenticate the account based on the authentication credentials. Processing logic can generate an access token based on the authentication. The access token can allow the client device (or a particular user of the client device) to access the API endpoint.

In some embodiments, the API endpoint receives a first request comprising first input data provided by the client device. The first request can be received directly from the client device or via the run-time dispatcher discussed above. The API endpoint provides the first input data as input for the loaded instance of the machine learning model. The API endpoint obtains first output data of the loaded instance of the machine learning model. The API endpoint can then send (directly or via the run-time dispatcher), to the client device, a first response to the first request. The first response includes an indication of the first output data of the machine learning model.

In some embodiments, the configuration information can further specify quality of service parameters. Processing logic can monitor quality metrics indicative of the quality of service parameters specified by the configuration information subsequent to configuring the API endpoint. Processing logic can determine that one or more of the quality metrics satisfies a threshold (e.g., based on information provided by the run-time dispatcher(s) or execution environment(s)). Responsive to determining that the one or more of the quality metrics satisfies the threshold, processing logic adjusts a number of the one or more virtual machines executing at the application platform and associated with the API endpoint.

In some embodiments, processing logic identifies an audit record that is associated with the API endpoint. Processing logic records audit information at the audit record. In some embodiments, the audit information is provided by the run-time dispatcher and/or the execution environment and includes one or more of the first input data of the first request, the first output data of the first response, or contextual information with respect to the first request or first response.

In some embodiments, processing logic performs one or more operations using the audit information of the audit record. In some embodiments, the one or more operations include a validation operation to validate the first output data obtained from the loaded instance of the machine learning model at the respective virtual machine of the one or more virtual machines against second output data obtained from another loaded instance of the machine learning model at another respective virtual machines. The first output data and the second output data are obtained by applying the first input data as input to the instance of the machine learning model that generated the first output data and another loaded instance of the machine learning model, such as another loaded instance of the machine learning model associated with the API endpoint.

In some embodiments, performing the one or more operations using the audit information of the audit record includes processing logic performing a data processing operation on the audit information to generate an audit data output. Processing logic can provide a graphical user interface (GUI) to the client device that presents a graphical representation of the audit data output.

FIG. 4 is a flow diagram illustrating a method 400 of preloading data into memory for use at run-time by a machine learning model execution environment at a virtual machine, in accordance with embodiments of the disclosure.

At block 410, processing logic of API endpoint management system 110 launches a machine learning model execution environment for a machine learning model at a virtual machine (e.g., one or more) on a host computer. Processing logic can perform the launching in response to a provisioning request or at a pre-programmed time.

At block 415, processing logic determines whether the machine learning model is associated with a dataset that is to be preloaded for use by the machine learning model execution environment during run-time. Processing logic can make this determination based on information in a provisioning request, configuration information associated with the machine learning model and/or information identifying a user or a group of users for whom the execution environment is being provisioned (e.g., if it is being provisioned for users from a particular department, information specific to that department can be included in the preload data), as will be discussed in more detail below.

At block 420, if the machine learning model is associated with a dataset that is to be preloaded, processing logic preloads a dataset that is associated with the machine learning model into memory that is accessible by the virtual machine.

At block 430, processing logic associates the machine learning model with an application programming interface (API) endpoint. In embodiments, the API endpoint receives input data for the machine learning model from a client device, where the received input data is to be aggregated with data of the preloaded dataset stored at the memory and provided as aggregated input data for the machine learning model to obtain output data of the machine learning model. The API endpoint returns the output data to the client device.

In some embodiments, prior to receiving input data at the API endpoint from the client device, processing logic can instantiate the virtual machine on the host computer at an application platform.

In some embodiments, prior to instantiating the VM, launching the machine learning model execution environment, and preloading a dataset that is associated with the machine learning model, processing logic can receive a request of the client device to configure the API endpoint. Processing logic can identify configuration information specified by the client device and stored at the application platform. In some embodiments, the configuration information includes one or more of an identifier of the machine learning model, an address of the API endpoint, an identifier of the preloaded dataset, or instructions to preload the preload dataset into the memory are specified by the configuration information.

In some embodiments, the API endpoint receives, from a client device, a first request including first input data that is to be combined with data of the preloaded dataset to generate the aggregated input data and be applied as input to the machine learning model. The data to be used for aggregation can be selected based on information included in the first request, the user of the client device and/or other factors (e.g., the timing of the first request, the type or content of first input data, etc.). The API endpoint obtains first output data produced by the machine learning model based on the aggregated first input data and sends, to the client device, a first response to the first request. The first response includes an indication of the first output data of the machine learning model.

In some embodiments, if the first request includes a data identifier to identify the data (e.g. subset) of the preloaded dataset based on the first input data, processing logic can obtain a data identifier from the first request. The data of the preloaded dataset can be associated with the data identifier. In some embodiments, the data identifier includes a user identifier of a user of the client system. The data of the preloaded dataset that is associated with the data identifier includes user information associated with the user of the client device.

In some embodiments, processing logic can generate the preload dataset based on a threshold number of most recent requests to the API endpoint by the client device. For example, the 50 most recent requests can be associated with users 1-50. If the threshold number of most recent requests is also 50, processing logic can generate the preload dataset to include user information (e.g., user account information, such as past purchases, gender, account identifier, etc.) associated with the 50 users that correspond to the 50 most recent requests sent to the API endpoint.

FIG. 5 is a flow diagram illustrating method 500 of providing run-time communications between a machine learning model execution environment and a client device, in accordance with embodiments of the disclosure. In some embodiments, method 500 is performed by processing logic of a run-time dispatcher.

At block 510, processing logic performing the method 500 receives a request of a client device that includes input data for a desired machine learning model. The request may include an identifier (e.g., address) of an API endpoint associated with the desired machine learning model or processing logic can identify an API endpoint associated with the desired machine learning model based on information requested from the API endpoint management system or previously provided by the API endpoint management system.

At block 520, processing logic determines an execution environment with a loaded instance of the desired machine learning model. The determination can be made by identifying active (currently running) VMs that are associated with the API endpoint, and determining which of the identified VMs have an available execution environment that has a loaded instance of the desired machine learning model and is not being used in conjunction with input data of any other client device. Processing logic can then select an execution environment at one of the determined VMs based, for example, on loads of VMs/hosts, resource capabilities of VMs/hosts, prior sessions of the client device, etc.

At block 530, processing logic instructs the API endpoint to forward the input data provided by the client device to the selected execution environment to obtain output data produced by the instance of the desired machine learning model based on the input data. The output data is then returned to the client device by the API endpoint or by processing logic.

Figure 6:
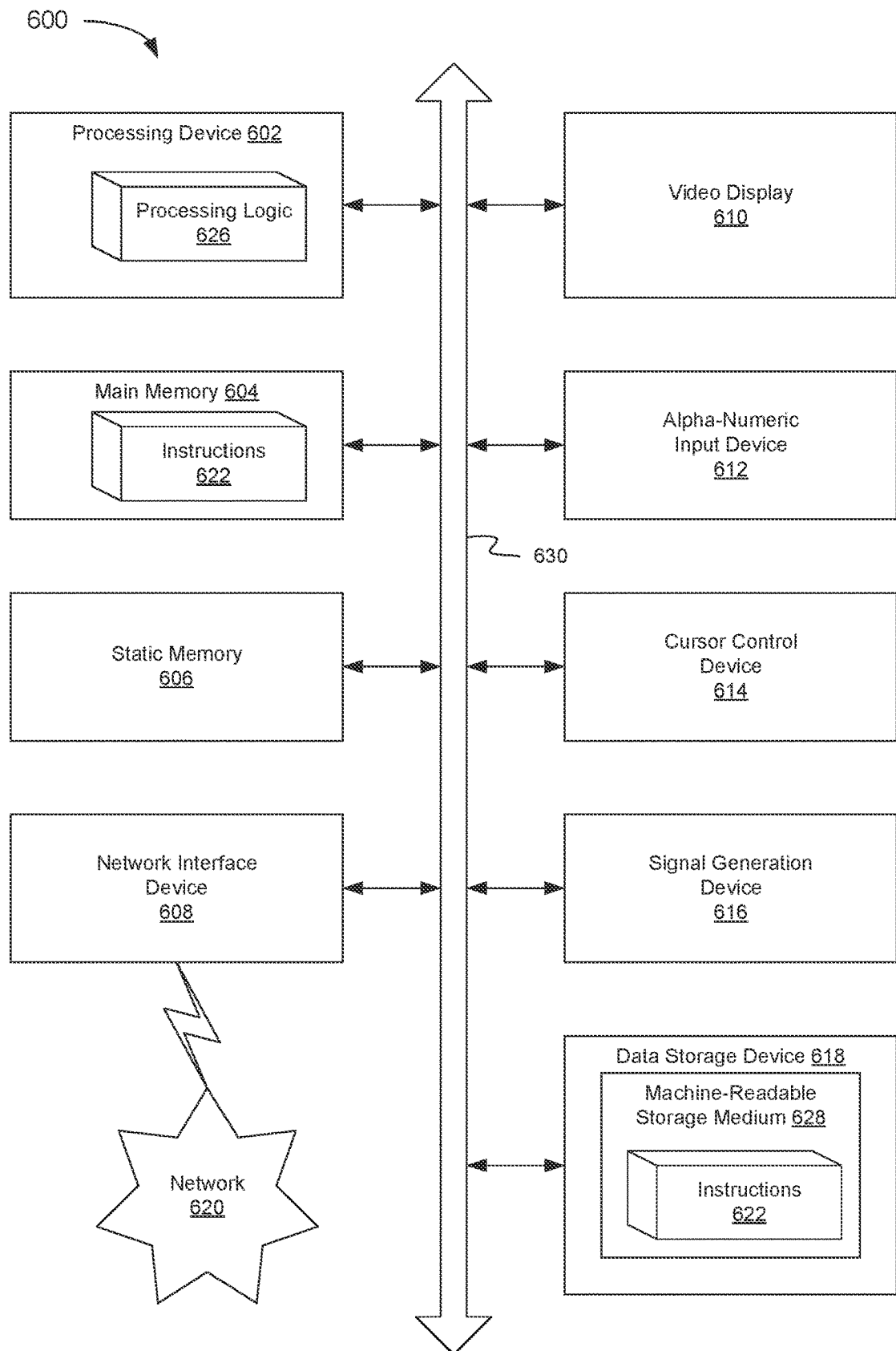
FIG. 6 is a block diagram illustrating a computer system, in accordance with some embodiments.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as a server of application platform 102 running API endpoint management system 110, or a client device 130.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein. In some embodiments, processing logic 626 can execute API endpoint management system 110, as described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608. In some embodiments, instructions 622 can include instructions to execute API endpoint management system 110, as described herein.

The machine-readable storage medium 628 may also be used to store instructions of column lineage and metadata propagation, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "launching," "instantiating," "executing," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   associating a loaded instance of a machine learning model, from a machine learning model execution environment, with an application programming interface (API) endpoint, the API endpoint configured to receive input data for the loaded instance of the machine learning model from a client device and to return output data produced by the loaded instance of the machine learning model based on the input data;
   receiving a request by the client device to configure the API endpoint; and
   identifying configuration information specified by the request, wherein an identifier of the machine learning model and a resource locator of the API endpoint are specified by the configuration information.

2. The method of claim 1, wherein the API endpoint is further configured to:
   receive a first request of the client device, the first request comprising first input data, provide the first input data as input for the loaded instance of the machine learning model, obtain first output data of the loaded instance of the machine learning model, and cause a first response comprising an indication of the first output data of the machine learning model to be sent to the client device.

3. The method of claim 2, wherein the first input data comprises client identifiers that are associated with client account information, and wherein the client account information comprises one or more from the group of: client location, gender, account details, and previous purchases.

4. The method of claim 2, further comprising:
   identifying an audit record that is associated with the API endpoint; and
   recording audit information at the audit record, wherein the audit information comprises one or more of the first input data of the first request, the first output data of the first response, or contextual information with respect to the first request or first response.

5. The method of claim 4, further comprising:
   performing one or more operations using the audit information of the audit record, the one or more operations comprising a validation operation to validate the first output data obtained from the loaded instance of the machine learning model at a respective virtual machine of one or more virtual machines against second output data obtained from another loaded instance of the machine learning model at another respective virtual machine, the second output data obtained by applying the first input data as input to the other loaded instance of the machine learning model.

6. The method of claim 5, wherein performing the one or more operations using the audit information of the audit record further comprises:
   performing a data processing operation on the audit information to generate an audit data output; and
   providing a graphical user interface (GUI) to the client device that presents a graphical representation of the audit data output.

7. The method of claim 1, wherein the API endpoint is further configured to receive the input data for the loaded instance of the machine learning model from the client device via an HTTP request, wherein the API endpoint is further configured to return output data produced by the loaded instance of the machine learning model based on the input data via an HTTP response.

8. The method of claim 1, wherein the configuration information further specifies quality of service parameters, the method further comprising:
   monitoring quality metrics indicative of the quality of service parameters specified by the configuration information subsequent to configuring the API endpoint;
   determining that one or more of the quality metrics satisfy a threshold; and
   responsive to determining that the one or more of the quality metrics satisfy the threshold, adjusting a number of one or more virtual machines executing at an application platform and associated with the API endpoint.

9. A method, comprising:
   accessing a machine learning model execution environment for a machine learning model at a virtual machine;
   determining whether the machine learning model is associated with a dataset that is to be preloaded for use by the machine learning model execution environment during run-time;
   in response to determining that the machine learning model is not associated with the dataset that is to be preloaded, associating the machine learning model with an application programming interface (API) endpoint, wherein the API endpoint is configured to receive input data provided by a client device for the machine learning model.

10. The method of claim 9, further comprising:
    instantiating the virtual machine at an application platform.

11. The method of claim 9, further comprising:
    receiving a request by the client device to configure the API endpoint; and
    identifying configuration information specified by the request and stored at an application platform, wherein the configuration information comprises one or more of an identifier of the machine learning model, an address of the API endpoint, an identifier of a preloaded dataset, or instructions to preload the preloaded dataset into a memory.

12. The method of claim 9, wherein the API endpoint is further configured to:

receive, from the client device, a first request comprising first input data that is to be combined with the data of a preloaded dataset to generate aggregated input data and be applied as input to the machine learning model, obtain from the machine learning model first output data based on the aggregated input data, and cause a first response comprising an indication of output data of the machine learning model to be sent to the client device.

13. The method of claim 12, wherein the first request comprises a data identifier associated with the data of the preloaded dataset.

14. The method of claim 13, wherein the data identifier comprises a user identifier of a user of the client device, and wherein the data of the preloaded dataset that is associated with the data identifier comprises user information associated with the user of the client device.

15. The method of claim 9, wherein the machine learning model comprises a neural network.

16. A system comprising:
a memory; and
a processing device, coupled to the memory to:
associate a loaded instance of a machine learning model, from a machine learning model execution environment, with an application programming interface (API) endpoint, the API endpoint configured to receive input data for the loaded instance of the machine learning model from a client device and to return output data produced by the loaded instance of the machine learning model based on the input data;
receive a request by the client device to configure the API endpoint; and
identify configuration information specified by the request and stored at an application platform, wherein an identifier of the machine learning model and a resource locator of the API endpoint are specified by the configuration information.

17. The system of claim 16, wherein the API endpoint is further configured to:
receive, from the client device, a first request comprising first input data,
provide the first input data as input for the loaded instance of the machine learning model,
obtain first output data of the loaded instance of the machine learning model, and
cause a first response to be sent to the client device, the first response comprising an indication of the first output data of the machine learning model.

18. The system of claim 17, wherein the first input data comprises client identifiers that are associated with client account information, and wherein the client account information comprises one or more from the group of: client location, gender, account details, and previous purchases.

19. The system of claim 16, the processing device further to:
receive, from the client device, an authentication request comprising authentication credentials corresponding to an account;
authenticate the account based on the authentication credentials; and
generate an access token based on the authentication, wherein the access token to allow the client device to access the API endpoint.

20. The system of claim 16, wherein the API endpoint is further configured to receive the input data for the loaded instance of the machine learning model from the client device via an HTTP request, wherein the API endpoint is further configured to return output data produced by the loaded instance of the machine learning model based on the input data via an HTTP response.

* * * * *